(12) United States Patent
De et al.

(10) Patent No.: US 8,160,845 B2
(45) Date of Patent: Apr. 17, 2012

(54) METHOD FOR EMULATING OPERATING SYSTEM JITTER

(75) Inventors: Pradipta De, Kolkata (IN); Ravi Kothari, New Delhi (IN); Vijay Mann, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 12/129,821

(22) Filed: May 30, 2008

(65) Prior Publication Data

US 2009/0299722 A1 Dec. 3, 2009

(51) Int. Cl.
*G06F 7/60* (2006.01)
*G06F 9/45* (2006.01)
*G06F 9/455* (2006.01)

(52) U.S. Cl. .................. 703/2; 703/22; 703/23

(58) Field of Classification Search ............... 703/2, 22, 703/23
See application file for complete search history.

(56) References Cited

OTHER PUBLICATIONS

Nataraj et al., (Nataraj hereinafter), The Ghost in the Machine: Observing the Effects of Kernel Operation on Parallel Application Performance, Proceedings of the 2007 ACM/IEEE Conference on Supercomputing, ISBN: 978-1-59593-764-3, pp. 1-12.*
Tsafrir et al., System Noise, OS Clock Ticks, and Fine-Grained Parallel Applications, ICS '05 Proceedings of the 19th Annual International Conference on Supercomputing, ISBN:1-59593-167-8, pp. 303-312.*
Beckman et al., Benchmarking the effects of operating system interference on extreme-scale parallel machines, Kluwer Academic Publishers, Journal Cluster Computing, vol. 11 Issue 1, Mar. 2008, pp. 1-22.*
Pradipta De, Ravi Kothari, Vijay Mann, A Trace-driven Emulation Framework to Predict Scalability of Large Clusters in Presence of OS Jitter, Proceedings of IEEE Cluster Computing 2008, Tsukuba, Japan, Sep. 2008, pp. 232-241.*
Beckman et al., Operating System Issues for Petascale Systems, Argonne National Laboratory, Mathematics and Computer Science Division, 2006, pp. 29-33.
Jones, et al., Improving the Scalability of Parallel Jobs by adding Parallel Awareness to the Operating System, ACM Supercomputing, Jun. 2003, pp. 1-20.
Parzen, On Estimation of a Probability Density Function and Mode, Stanford University, Annals of Math. Stats, vol. 33, pp. 1065-1076, 1962.
Petrini, et al., The Case of the Missing Supercomputer Performance: Achieving Optimal Performance on the 8,192 Processors of ASCI Q, ACM Supercomputing, 2003, pp. 1-17.
Tsafrir, The Context-Switch Overhead Inflicted by Hardware Interrupts (and the Enigma of Do-nothing Loops), IBM T.J. Watson Research Center, ACM 2007, pp. 1-14.

(Continued)

*Primary Examiner* — Paul Rodriguez
*Assistant Examiner* — Juan Ochoa
(74) *Attorney, Agent, or Firm* — Ryan, Mason & Lewis, LLP (57) ABSTRACT

Techniques for emulating operating system jitter on a platform using a given trace are provided. The techniques include calculating a scale factor, wherein the scale factor is equal to a maximum of measured overhead of introducing synthetic jitter on the platform and a resolution of one or more timer calls on the platform, scaling up each of one or more jitter values and each of one or more gaps between each of one or more jitter instances in the trace and an execution period of a benchmark parallel application using the scale factor, introducing synthetic jitter using each of the one or more scaled jitter values and each of the one or more scaled gaps from the trace while running the benchmark parallel application for the scaled execution period to emulate operating system jitter on a platform, and scaling down one or more final time measurements from the benchmark parallel application by the scale factor.

24 Claims, 6 Drawing Sheets

OTHER PUBLICATIONS

Beckman et al., The Influence of Operating Systems on the Performance of Collective Operations at Extreme Scale, IEEE International Conference on Cluster Computing, 2006, pp. 1-12.

Burger et al., Paging Tradeoffs in Distributed-Shared-Memory Multiprocessors, Journal of Supercomputing, vol. 10, No. 1, pp. 87-104, Mar. 1996.

De et al., Indentifying Sources of Operating System Jitter Through Fine-Grained Kernel Instrumentation, IEEE Cluster, 2007.

Hoisie et al., A Performance Comparison Through Benchmarking and Modeling of Three Leading Supercomputers: Blue Gene/L, Red Storm, and Purple, ACM Supercomputing, 2006, pp. 1-10.

Kaplan, Lightweight Linux for High-Performance Computing, Linuxworld.com, Dec. 2006, http://www.linuxworld.com/news/2006/120406-lightweight-linux.html.

The BlueGene/L Team, An Overview of the BlueGene/L Supercomputer, ACM Supercomputing, 2003, pp. 1-22.

Terry et al., Improving Application Performance on HPC Systems with Process Synchronization, Linux Journal, No. 127, pp. 68-73, Nov. 2004.

Jun. 2007/TOP500 Supercomputing Sites, http://www.top500.org/list/2007/06.

Sottile et al., Performance analysis of parallel programs via message-passing graph traversal, Feb. 2006, pp. 1-29.

Sottile et la., A Framework for Trace Based Performance Analysis of Parallel Programs via Message Passing Graph Traversal, Georgia Tech, College of Computing, 1 page, IPDPS'06 Proceedings of the 20th International Conference on Parallel and Distributed Processing, 2006.

Cray Inc. The Supercomputer Company, Cray XT4 and XT3 Supercomputers, http://www.cray.com/products/xt4/, pp. 1-12, accessed on Sep. 15, 2008.

Garg et al., Impact of Noise on Scaling of Collectives: An Empirical Evaluation, IBM India Research Laboratory, New Delhi, pp. 1-12, HiPC'07 Proceedings of the 14th International Conference on High Performance Computing, 2007.

Minnich et al., Right-Weight Kernels: an off-the-shelf alternative to custom Light-Weight Kernels, Los Alamos National Laboratory, pp. 22-28, Operating Systems Review, SIGOPS, vol. 40, No. 2, pp. 22-28, 2006.

Zeptoos: The small linux for big computers, http://www-unix.mcs.anl.gov/zeptoos/, accessed on Sep. 15, 2008.

\* cited by examiner

METHOD FOR EMULATING OPERATING SYSTEM JITTER

STATEMENT OF GOVERNMENT RIGHTS

This invention was made with Government support under Contract No: HR0011-07-9-0002, awarded by the Defense Advanced Research Projects Agency (DARPA). The Government has certain rights in this invention.

FIELD OF THE INVENTION

The present invention generally relates to information technology, and, more particularly, to operating system jitter.

BACKGROUND OF THE INVENTION

Operating system (OS) jitter refers to the interference experienced by an application due to scheduling of daemon processes and handling of asynchronous events such as interrupts. Existing approaches have shown that parallel applications on large clusters suffer considerable degradation in performance (for example, up to 100% degradation at 4096 processors) due to OS jitter. Several large scale high performance computing (HPC) systems such as, for example, Blue Gene/L and Cray XT4, avoid OS jitter by making use of a customized light-weight microkernel at the compute nodes. These customized kernels typically do not support general purpose multi-tasking and may not even support interrupts. However, these systems require applications to be modified or ported for their respective platforms.

Other existing systems make use of commodity OSes and still suffer from OS jitter. Such systems make use of various techniques to mitigate the effect of OS jitter. Existing techniques include synchronization of jitter across all nodes that can yield moderate (close to 50%) to very high (close to 300%) performance improvements. Existing approaches also use simultaneous multi-threaded (SMT) and hyper-threaded processors in mitigating jitter, but they may have other performance implications.

With a growing interest in the use of commodity OSes for HPC systems, there is a much greater need to develop and evaluate various techniques fox mitigating OS jitter. However, effectiveness of any technique to mitigate jitter should advantageously be evaluated in a large cluster with thousands of nodes. One of the biggest hindrances in the development and evaluation of new techniques for handling jitter is that there are a few large clusters running commodity OSes worldwide, which are often unavailable for experimental and validation purposes.

Emulating jitter on a large "jitter-free" platform using either synthetic jitter or real traces from commodity OSes has been proposed as a useful mechanism to study scalability behavior under the presence of jitter in existing approaches. Such approaches make use of a single node benchmark to measure jitter and inject synthetic jitter of varying length and periodicity on a jitter-less platform such as Blue Gene/L to study its impact on scalability of various collective operations. Such approaches also provide a comparison of the effect of synchronized and unsynchronized jitter on performance, and make use of purely synthetic jitter rather than collecting traces from real Linux systems. Also, existing approaches attempt to record real jitter traces and replay them to explore system performance.

The existing approaches to predict system performance noted above require an accurate methodology for precisely emulating jitter. However, existing approaches for introducing synthetic jitter suffer from several inaccuracies such as the ones caused due to system overhead of introducing jitter, resolution of timer (or sleep) calls, etc.

SUMMARY OF THE INVENTION

Principles of the present invention provide techniques for emulating operating system jitter. An exemplary method (which may be computer-implemented) for emulating operating system jitter on a platform using a given trace, according to one aspect of the invention, can include steps of calculating a scale factor, wherein the scale factor is equal to a maximum of measured overhead of introducing synthetic jitter on the platform and a resolution of one or more timer calls on the platform, scaling up each of one or more jitter values and each of one or more gaps between each of one or more jitter instances in the trace and an execution period of a benchmark parallel application using the scale factor, introducing synthetic jitter using each of the one or more scaled jitter values and each of the one or more scaled gaps from the trace while running the benchmark parallel application for the scaled execution period to emulate operating system jitter on a platform, and scaling down one or more final time measurements from the benchmark parallel application by the scale factor.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings

DETAILED DESCRIPTION OF PREFERRED EMBODIMENTS

Principles of the present invention include collecting operating system jitter traces on diverse platforms that can be used to precisely emulate jitter on a jitter-free platform. The techniques described herein are based on several innovative techniques to avoid possible pitfalls that may lead to inaccuracies in jitter emulation. In contrast to disadvantageous existing approaches, one or more embodiments of the present invention include emulating operating system jitter on a large jitter-free platform using a real trace.

Any methodology for emulating OS jitter by introducing synthetic jitter should take note of a variety of pitfalls and should incorporate ways to overcome them. For example, one pitfall can include the notion that introduction of synthetic jitter on a given platform might have an overhead of its own. This overhead should be measured and accounted for while introducing any synthetic jitter. Another pitfall can include, for example, that on a given system, any jitter which is less than a particular value cannot be introduced either because it is larger than the overhead itself or because of some other reason.

Also, a pitfall can include the notion that the time gap between introducing any two jitter samples may not be smaller than a particular value because of system specific limitations on cycle accurate timers and sleep system calls. Further, another pitfall can include, for example, the concept that a realistic emulation of jitter on a large number of nodes using a jitter trace collected from a single node requires that the single node trace be very large and the individual nodes replay only a small portion of that trace. If all of the nodes replay the entire trace (even if they start at different points in the trace), all nodes will end up observing the same set of jitter samples (albeit at different points of time), something which is unlikely to happen in a real setup. Also, in the case of a large number of nodes, percentage of slowdown of each phase might turn out to be the same.

As described herein, one or more embodiments of the invention include a jitter emulator, which is a component that resides on each processor where a message passing interface (MPI) task runs. The jitter emulator reads the given jitter trace file into an in-memory data structure. This data structure might have several records where each record includes a start-time (a time-stamp for the jitter activity), a run-time (duration of the jitter activity), and sleep-time (time gap between the current and the next jitter activity). The jitter emulator can introduce the jitter corresponding to a particular record in the jitter trace by executing a busy loop for the given run-time, followed by executing a sleep for the given sleep-time.

Additionally, the jitter emulator can run within the context of the application process or within its own process context. Running the jitter emulator within the application process context can result in the application having to be re-compiled with a call to the jitter emulator. Running the jitter emulator within its own separate context does not require such a recompilation of the application. However, the target platform must support multiple processes or multi-tasking for this option and one must ensure that the jitter emulator process has a much higher priority than the application process (so that it always gets a chance to run). On platforms that do not support multiple processes on the compute nodes (jitter-less platforms such as Blue Gene/L), one can make use of the first option and run the jitter emulator within the application process context. The application can then be re-compiled with a call to the jitter emulator.

If the application is a parallel application, and jitter is being emulated in a large cluster, choosing the point in the jitter trace from where the jitter emulators at all nodes start introducing jitter is an important decision and it can have interesting ramifications. In a cluster that has unsynchronized jitter, different kinds of jitter activities will hit each node at different points in time. On the other hand, in a cluster that has employed a mechanism for synchronizing jitter across all nodes, jitter activities will hit each node at the same time. In order to emulate the unsynchronized jitter scenario, the jitter emulators at all nodes start introducing jitter from different randomly chosen points in the jitter trace. To emulate synchronized jitter, the jitter emulators at all nodes start introducing jitter from the same randomly chosen point in the jitter trace. A key point to note here is that if the sleep calls on the jitter emulation platform have some variance that will cause the jitter emulators at various nodes to get out of sync some time after starting at the same index in the trace. This will break the synchronization of the jitter. To overcome this pitfall in order to emulate a perfectly synchronized jitter, the jitter trace index should be reset to the same randomly chosen value across all nodes in each compute phase (or at a regular interval) instead of doing it just once at start-up.

By way of example, on Blue Gene/L, the jitter emulator makes use of the interval timer mechanism (using the setitimer system call) to transfer control to itself. It sets up a signal handler for the SIGALRM signal. The setitimer system call sets up a timer, which on expiry delivers the SIGALRM signal to the parallel benchmark application process. The signal handler (timer handler) routine executes a busy loop for the jitter duration (that is, the run-time) and also sets the next timer after an interval equal to the sleep-time in the current jitter trace record. It can then increment the index in the jitter trace so that it picks up the next jitter record in the trace when the timer expires again.

On Blue Gene/L, the jitter emulator can make use of several techniques to safeguard against the pitfalls discussed earlier. For example, one can measure the overhead of introducing jitter on Blue Gene/L to be in the range 14-16 µs. Out of this, the overhead of the setitimer system call is about 10 µs (measured by having an empty timer handler routine). The remaining 4-6 µs are spent in the various steps in the timer handler routine. In order to offset this overhead, one can reduce the run-time of all jitter values by 14 µs. This can, however, imply that any jitter value less than 14 µs cannot be introduced during emulation. This is generally unacceptable as most timer interrupt activity is less than 14 µs and an analysis of one of the jitter traces reveals that nearly 95% of jitter values are less than 14 µs. To overcome this, one can scale all the jitter values (run-time and sleep-time) as well as the quanta time (that is, the time taken for each compute phase and the total running period of the parallel application) by a constant factor. Additionally, in one or more embodiments of the invention, all values (competition times and barrier times for the application) are scaled down by the same factor.

One can use a scaling factor of 14 to ensure that all jitter values in the trace can be emulated. However, this can result in running the parallel application for a period 14 times longer than the intended period. In an illustrative embodiment of the invention, one can use a scaling factor of three. This allows one to introduce all jitter values that are greater than or equal to 5 µs. Analysis of one of the traces revealed that 85% of the jitter values are greater than or equal to 5 µs. Hence, with a scaling factor of three, one is able to emulate 85% of the jitter samples in the trace.

Additionally, one can measure the timer resolution on Blue Gene/L to be nearly 200 µs. This implies that if one sets a timer that wakes up in less than 200 µs, the results are likely to be inaccurate. Moreover, for values greater than 200 µs, the timer might expire a bit longer (up to 200 µs) after the indicated value. Analysis of one of the jitter trace reveals that about 5.8% of the sleep values (time gap between jitter samples), around 30K samples out of 515K, are less than 200 µs. By using a scale factor of three, all sleep values above ~65 µs can be reliably reproduced. The trace reveals that around 9.5K samples, 1.8%, are below 65 µs. Thus, by using a scale factor of three, one is able to cover ~98% of the trace values.

The gap between any two jitter instances is likely to have some inaccuracy because of the resolution of the sleep time being 20 µs. This is compensated by adjusting all of the sleep times for the timer resolution. However, it should be noted that the timer on Blue Gene/L also has a standard deviation of about 20 µs. This implies that even if all of the nodes start jitter emulation at the same index in the trace (to emulate synchronized jitter), they will get out of sync with time because of the variance in sleep time. This will cause problems in emulating perfectly synchronized jitter. As noted above, existing approaches do not take into account the variance in sleep calls and hence, their emulation of synchronized jitter does not represent perfect synchronization. One can over come this limitation, as described herein, by resetting the trace index to the same randomly chosen value across all nodes in each compute phase instead of doing it just once at start-up. This helps in emulating perfectly synchronized jitter.

Also, in order to ensure that all nodes do not end up observing all sets of jitter values (that is, the entire trace) in a given experiment, and that each node replays only a reasonably small portion of the entire trace, the jitter emulator framework can stop the experiment as soon as any one node finishes a fixed percentage of the total trace. For example, one can introduce only one third of the trace in each run.

Figure 1:
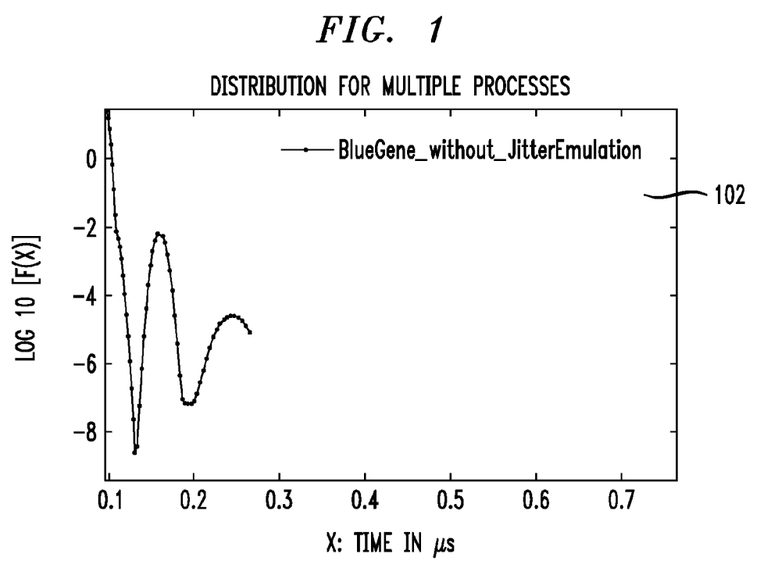
FIG. 1 is a diagram illustrating a distribution of jitter on Blue Gene/L with output from a single node benchmark, according to an embodiment of the present invention.
Figure 2:
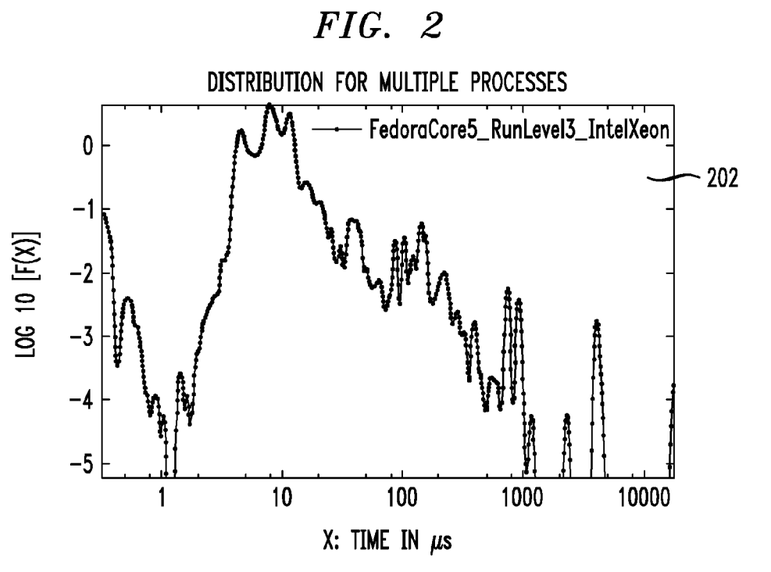
FIG. 2 is a diagram illustrating a distribution of jitter on Intel Xeon running Fedora Core 5 (run level 3), according to an embodiment of the present invention.

FIG. 1 is a diagram 102 illustrating a distribution of jitter on Blue Gene/L with output from a single node benchmark, according to an embodiment of the present invention. One can run the single node benchmark on a single processor on Blue Gene without any jitter emulator. The output of the single node benchmark is shown in FIG. 1, where the distribution of jitter durations using the parzen window density estimation technique is plotted. The highest jitter value detected by the single node benchmark is around 0.3 µs. This shows that Blue Gene/L has a nearly jitter-free environment (compare this output with the single node benchmark output from an Intel Xeon Machine running Linux, as depicted in FIG. 2). As such, FIG. 2 is a diagram 202 illustrating a distribution of jitter on Intel Xeon running Fedora Core 5 (run level 3), according to an embodiment of the present invention.

One can validate the accuracy of the jitter emulation and the effectiveness of the techniques described herein on a single node by running the single node benchmark on single processor on Blue Gene while jitter is being replayed by the jitter emulator. This includes a re-compilation of the single node benchmark with a call to the jitter emulator. One can, for example, compare the output of the single node benchmark (frequency distribution of jitter durations) from an Intel machine running Linux (Fedora Cole 5, 2.6.20.7 kernel, run level 3) with that of a Blue Gene/L node with jitter emulator (and using a trace collected from the same Intel machine running Linux). In order to validate that the jitter emulation framework has successfully emulated jitter on Blue Gene/L that is representative of the jitter encountered on an Intel machine running Linux (Fedora Core 5, 2 6 20.7 kernel, run level 3), the two distributions should match.

Figure 3:
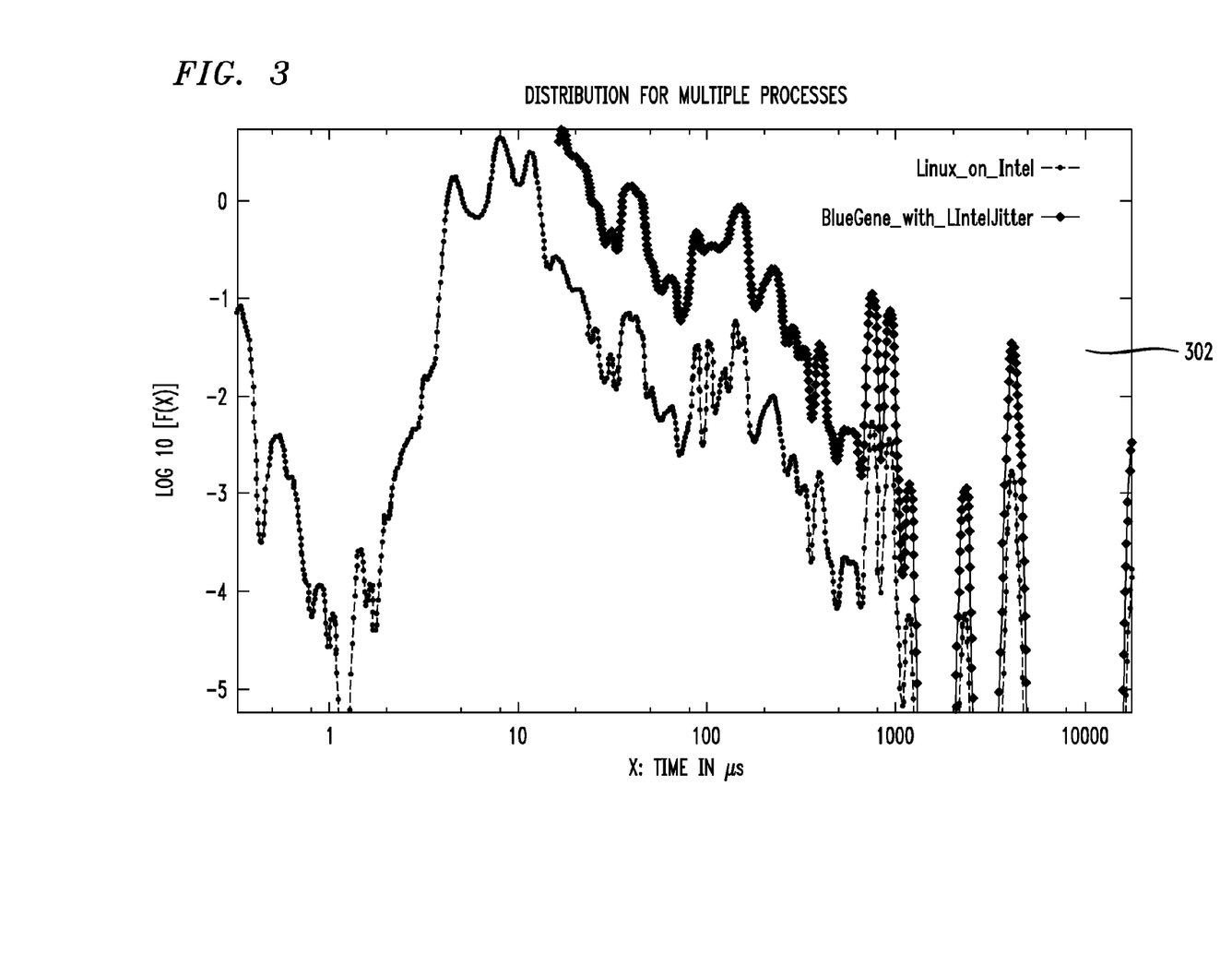
FIG. 3 is a diagram illustrating verification of jitter emulation on a single node without applying a scaling factor, according to an embodiment of the present invention.
Figure 4:
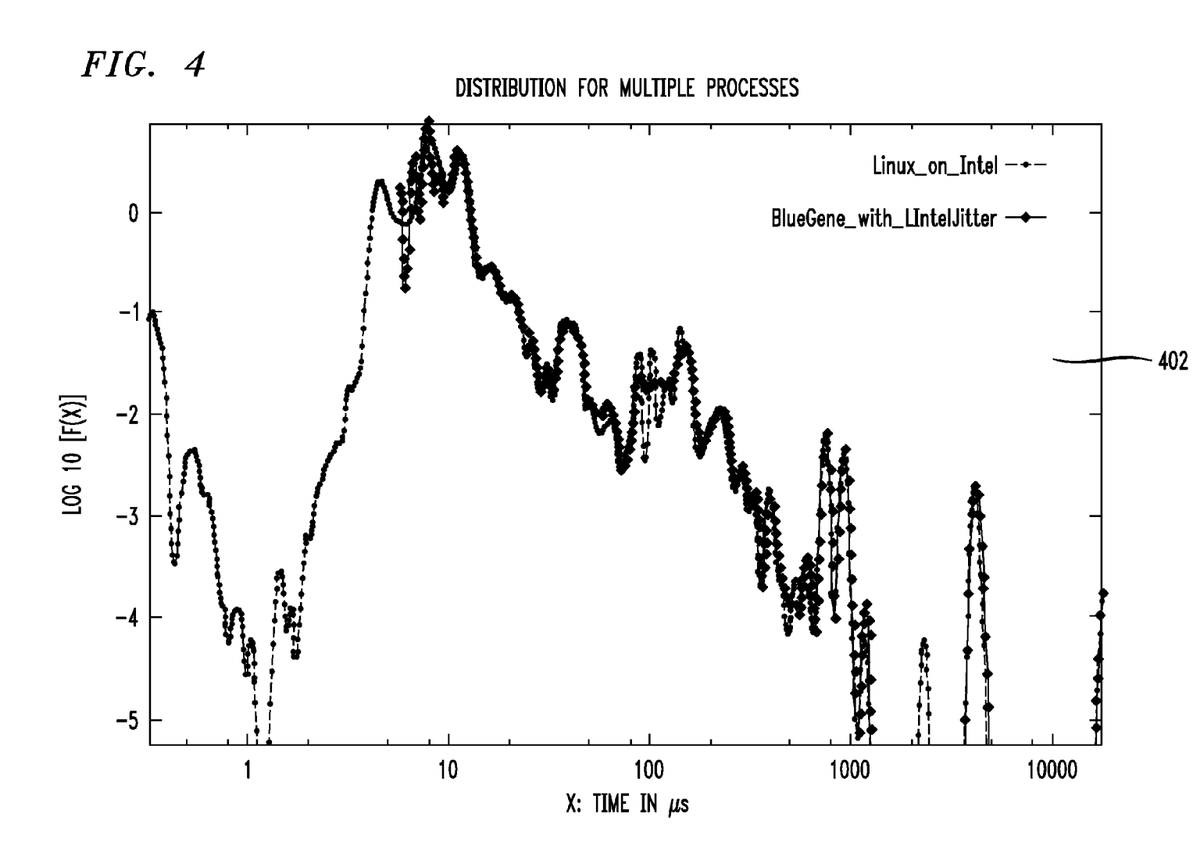
FIG. 4 is a diagram illustrating verification of jitter emulation after applying a scaling factor of three, according to an embodiment of the present invention.

FIG. 3 is a diagram 302 illustrating verification of jitter emulation on a single node without applying a scaling factor, according to an embodiment of the present invention. Also, FIG. 4 is a diagram 402 illustrating verification of jitter emulation after applying a scaling factor of three, according to an embodiment of the present invention. As noted herein, FIG. 3 and FIG. 4 plot the jitter duration for the two cases mentioned above as probability distributions using a Parzen window density estimation technique. The y-axis is a logarithm of the probability that a particular jitter occurs and the x-axis is the jitter duration in µs.

FIG. 3 depicts the distribution without applying any scaling factor. The emulated jitter curve starts only after 14 µs. This is because no jitter less than 14 µs could be introduced because of the pitfalls mentioned above (overhead of jitter introduction itself being 14 µs). Although the nature of the two distributions is similar in the region greater than 14 µs, the emulated jitter curve is shifted up. This happens due to the fact that the probability of occurrence of each jitter sample in the emulated jitter curve gets raised because samples in the emulated jitter curve (that is, samples that are greater than 14 µs) constitute just 5% of the total number of jitter samples (in the original jitter curve from Intel).

FIG. 4 depicts the distribution after scaling all jitter values (run-times and sleep-times) by a factor of three. The usefulness of this technique can be observed immediately. In this case, one is able to introduce jitter values greater than 5 µs, and the two distributions exhibit close matching after the 5 µs point on the x-axis. The emulated jitter curve not only starts at 5 µs (as compared to 14 µs), but it also shifts down. This happens because the total number of jitter samples that are greater than 5 is are almost 85% of the total number of jitter samples (in the original jitter curve from Intel), and therefore the probability of occurrence of each jitter sample in the emulated jitter curve starts matching with that of the original jitter curve from Intel.

Figure 5:
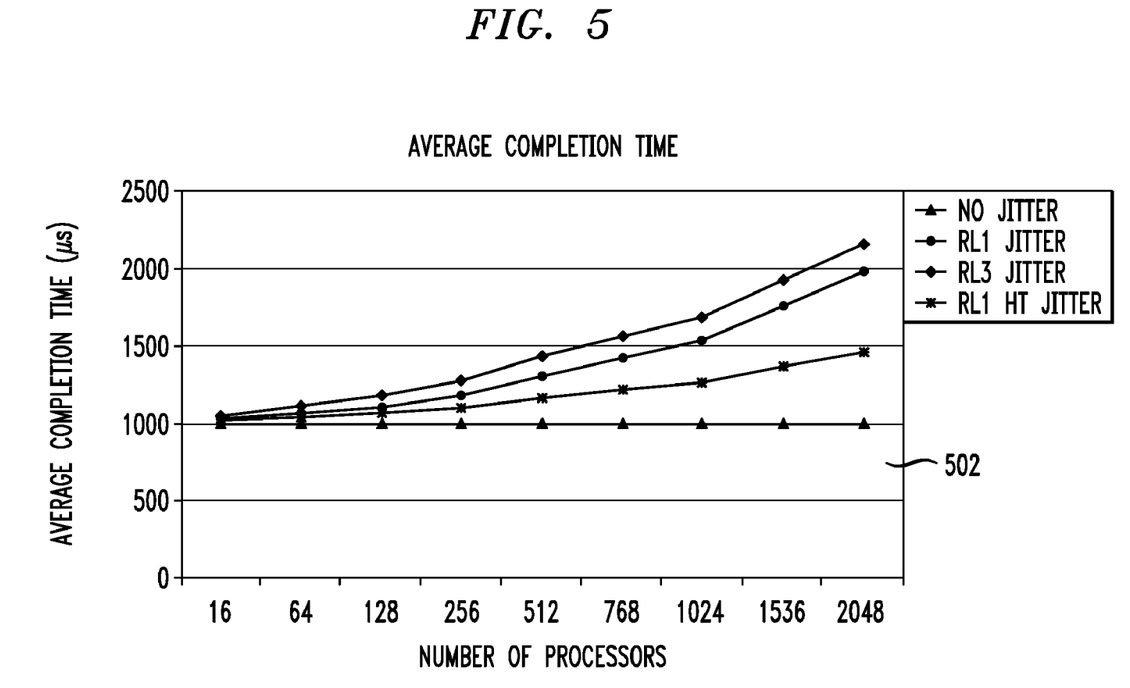
FIG. 5 is a diagram illustrating average completion time, according to an embodiment of the present invention.

FIG. 5 is a diagram 502 illustrating average completion time, according to an embodiment of the present invention. One or more embodiments of the present invention can be used to predict scaling performance of large clusters (in presence of OS Jitter) running various operating systems under different configurations (as depicted in FIG. 5).

Figure 6:
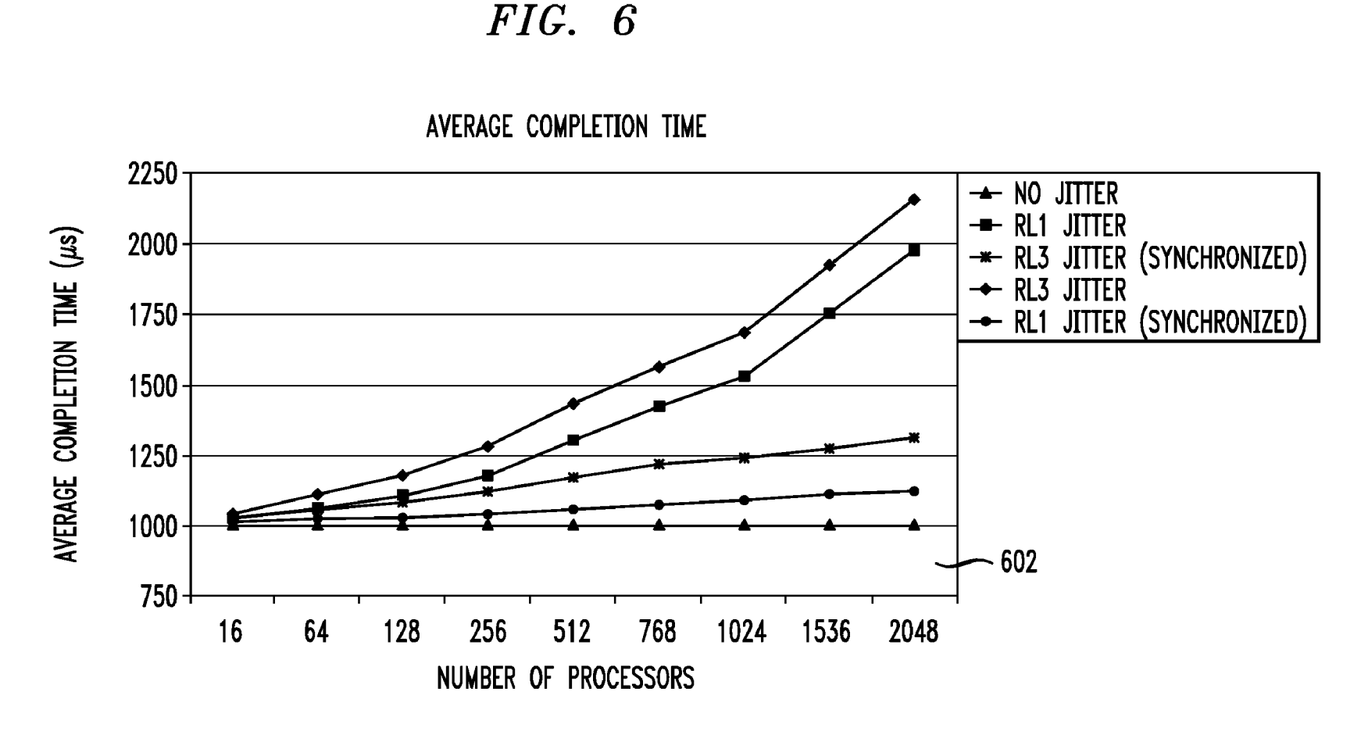
FIG. 6 is a diagram illustrating average completion time, according to an embodiment of the present invention.

FIG. 6 is a diagram 602 illustrating average completion time, according to an embodiment of the present invention. One or more embodiments of the present invention can be used to evaluate effectiveness of various techniques for handle jitter (as depicted in FIG. 6).

Figure 7:
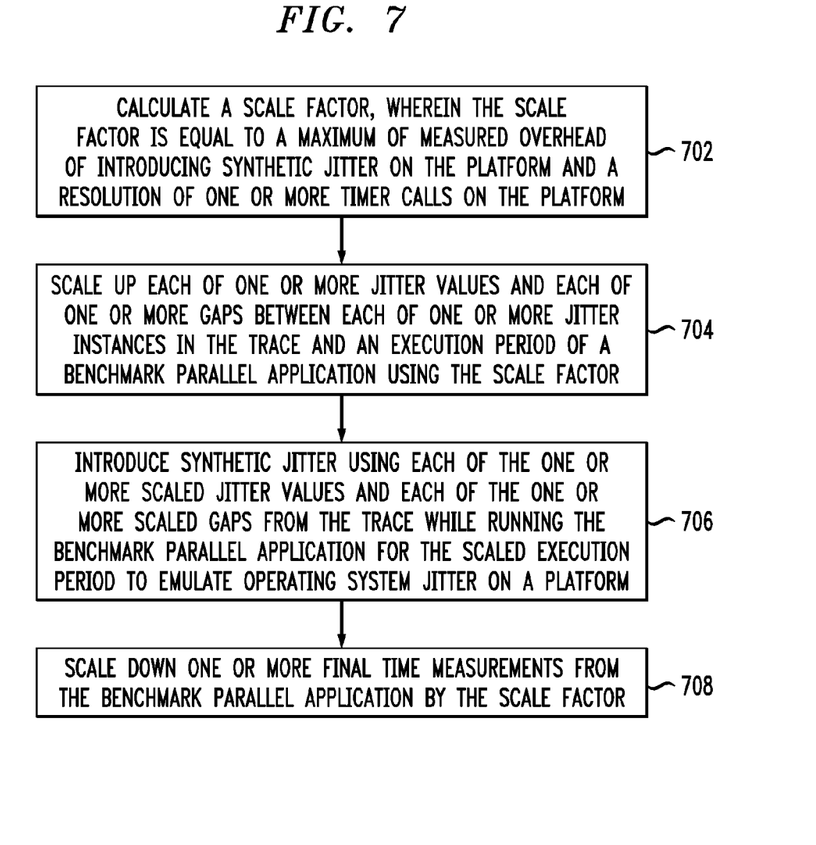
FIG. 7 is a flow diagram illustrating techniques for emulating operating system jitter on a platform using a given trace, according to an embodiment of the present invention.

FIG. 7 is a flow diagram illustrating techniques for emulating operating system jitter on a platform (for example, an emulation platform) using a given trace (for example, that allows emulation of the smallest possible jitter in a precise manner), according to an embodiment of the present invention. Step 702 includes calculating a scale factor, wherein the scale factor is equal to a maximum of measured overhead of introducing synthetic jitter on the platform and a resolution of one or more timer calls on the platform. Step 704 includes scaling up each of one or more jitter values and each of one or more gaps between each of one or more jitter instances in the trace and an execution period of a benchmark parallel application using the scale factor. Scaling up the execution period of the benchmark parallel application can include scaling up a compute phase time and a total running period.

Introducing one or more synthetic jitter values from the trace can include stopping the benchmark parallel application (for example, through a timer (in the case of single threaded platforms) or through a high priority thread waking up from sleep (in the case of multi-tasking platforms)) and executing a busy loop for the given jitter value.

Step 706 includes introducing synthetic jitter using each of the one or more scaled jitter values and each of the one or more scaled gaps from the trace while running the benchmark parallel application for the scaled execution period to emulate operating system jitter on a platform. Step 708 includes scaling down one or more final time measurements from the benchmark parallel application by the scale factor.

The techniques depicted in FIG. 7 can also include emulating operating system jitter as a separate process executing at a high priority (in the case of multi-tasking emulation platforms), and/or emulating operating system jitter in a same process as the benchmark parallel application (in the case of a single threaded emulation platforms). One or more embodiments of the present invention additionally include yielding a central processing unit (CPU) back to the benchmark parallel application (for example, either by setting a timer for the next jitter (in the case of single threaded platforms) or by a high priority thread executing a sleep call (in the case of multi-tasking platforms)).

Also, the techniques depicted in FIG. 7 can include replaying a portion (for example, less than 100%) of the given trace at each of the nodes during emulation of a large cluster so that all of the nodes do not end up observing the same set of jitter samples. Further, one or more embodiments of the invention include resetting an index in the given trace to a same randomly chosen value across all of the nodes in each compute phase and/or at a regular interval to overcome the variance in timer calls while emulating perfectly synchronized jitter.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 8:
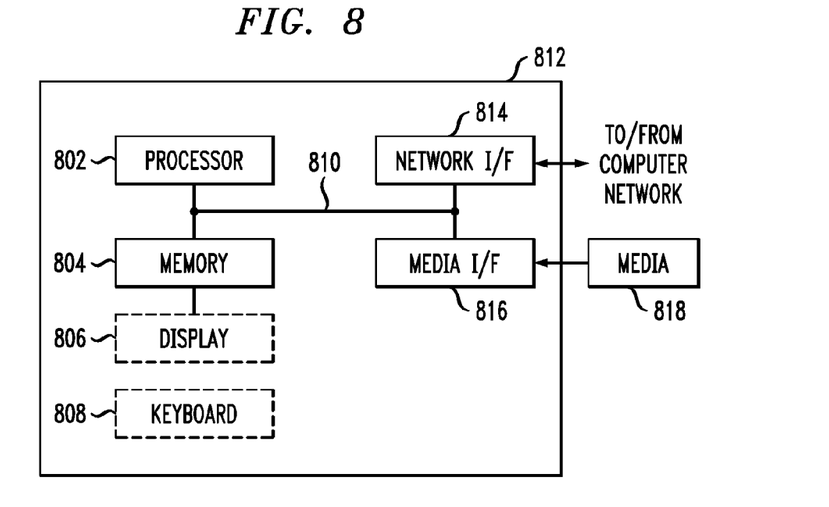
FIG. 8 is a system diagram of an exemplary computer system on which at least one embodiment of the present invention can be implemented.

At present, it is believed that the preferred implementation will make substantial use of software running on a general-purpose computer or workstation. With reference to FIG. 8, such an implementation might employ, for example, a processor 802, a memory 804, and an input and/or output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phase "input and/or output interface" as used herein, is intended to include, for example, one or more mechanisms for inputting data to the processing unit (for example, mouse), and one or more mechanisms for providing results associated with the processing unit (for example, printer). The processor 802, memory 804, and input and/or output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium Examples of a computer-readable medium include a semiconductor or solid-state memory (for example, memory 804), magnetic tape, a removable computer diskette (for example, media 818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 808, displays 806, pointing devices, and the like) can be coupled to the system either directly (such as via bus 810) or through intervening P/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, emulating operating system jitter on a large jitter-free platform using a real trace.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for emulating operating system jitter on a platform using a given trace, comprising the steps of:

calculating a scale factor, wherein the scale factor is equal to a maximum of measured overhead of introducing synthetic jitter on the platform and a resolution of one or more timer calls on the platform;

scaling up each of one or more jitter values and each of one or more gaps between each of one or more jitter instances in the trace and an execution period of a benchmark parallel application using the scale factor;

introducing synthetic jitter using each of the one or more scaled jitter values and each of the one or more scaled gaps from the trace while running the benchmark parallel application for the scaled execution period to emulate operating system jitter on a platform; and scaling down one or more final time measurements from the benchmark parallel application by the scale factor.

2. The method of claim 1, wherein scaling up the execution period of the benchmark parallel application comprises scaling up a compute phase time and a total running period.

3. The method of claim 1, further comprising emulating operating system jitter as a separate process executing at a high priority.

4. The method of claim 1, further comprising emulating operating system jitter in a same process as the benchmark parallel application.

5. The method of claim 1, wherein introducing one or more synthetic jitter values from the trace comprises stopping the benchmark parallel application and executing a busy loop for the given jitter value.

6. The method of claim 1, further comprising yielding a central processing unit (CPU) back to the benchmark parallel application.

7. The method of claim 1, further comprising replaying a portion of the given trace at each of one or more nodes during emulation of a large cluster.

8. The method of claim 1, further comprising resetting an index in the given trace to a same randomly chosen value across all of one or more nodes in each compute phase while emulating perfectly synchronized jitter.

9. A computer program product comprising a tangible computer readable recordable storage medium having computer readable program code for emulating operating system jitter on a platform using a given trace, said computer program product including:

computer readable program code for calculating a scale factor, wherein the scale factor is equal to a maximum of measured overhead of introducing synthetic jitter on the platform and a resolution of one or more timer calls on the platform;

computer readable program code for scaling up each of one or more jitter values and each of one or more gaps between each of one or more jitter instances in the trace and an execution period of a benchmark parallel application using the scale factor;

computer readable program code for introducing synthetic jitter using each of the one or more scaled jitter values and each of the one or more scaled gaps from the trace while running the benchmark parallel application for the scaled execution period to emulate operating system jitter on a platform; and computer readable program code for scaling down one or more final time measurements from the benchmark parallel application by the scale factor.

10. The computer program product of claim 9, wherein the computer readable program code for scaling up the execution period of the benchmark parallel application comprises computer readable program code for scaling up a compute phase time and a total running period.

11. The computer program product of claim 9, further comprising computer readable program code for emulating operating system jitter as a separate process executing at a high priority.

12. The computer program product of claim 9, further comprising computer readable program code for emulating operating system jitter in a same process as the benchmark parallel application.

13. The computer program product of claim 9, wherein the computer readable code for introducing one or more synthetic jitter values from the trace comprises computer readable program code for stopping the benchmark parallel application and executing a busy loop for the given jitter value.

14. The computer program product of claim 9, further comprising computer readable program code for yielding a central processing unit (CPU) back to the benchmark parallel application.

15. The computer program product of claim 9, further comprising computer readable program code for replaying a portion of the given trace at each of one or more nodes during emulation of a large cluster.

16. The computer program product of claim 9, further comprising computer readable program code for resetting an index in the given trace to a same randomly chosen value across all of one or more nodes in each compute phase while emulating perfectly synchronized jitter.

17. A system for emulating operating system jitter on a platform using a given trace, comprising:

a memory; and at least one processor coupled to said memory and operative to:

calculate a scale factor, wherein the scale factor is equal to a maximum of measured overhead of introducing synthetic jitter on the platform and a resolution of one or more timer calls on the platform;

scale up each of one or more jitter values and each of one or more gaps between each of one or more jitter instances in the trace and an execution period of a benchmark parallel application using the scale factor;

introduce synthetic jitter using each of the one or more scaled jitter values and each of the one or more scaled gaps from the trace while running the benchmark parallel application for the scaled execution period to emulate operating system jitter on a platform; and scale down one or more final time measurements from the benchmark parallel application by the scale factor.

18. The system of claim 17, wherein the at least one processor coupled to said memory and operative to scale up the execution period of the benchmark parallel application is further operative to scale up a compute phase time and a total running period.

19. The system of claim 17, wherein the at least one processor coupled to said memory is further operative to emulate operating system jitter as a separate process executing at a high priority.

20. The system of claim 17, wherein the at least one processor coupled to said memory is further operative to emulate operating system jitter in a same process as the benchmark parallel application.

21. The system of claim 17, wherein the at least one processor coupled to said memory and operative to introduce one or more synthetic jitter values from the trace is further operative to stop the benchmark parallel application and executing a busy loop for the given jitter value.

22. The system of claim 17, wherein the at least one processor coupled to said memory is further operative to yield a central processing unit (CPU) back to the benchmark parallel application.

23. The system of claim 17, wherein the at least one processor coupled to said memory is further operative to replay a portion of the given trace at each of one or more nodes during emulation of a large cluster.

24. The system of claim 17, wherein the at least one processor coupled to said memory is further operative to reset an index in the given trace to a same randomly chosen value across all of one or more nodes in each compute phase while emulating perfectly synchronized jitter.

* * * * *